United States Patent

Sundberg

[15] 3,650,833

[45] Mar. 21, 1972

[54] MULTICELL STORAGE BATTERY

[72] Inventor: Erik G. Sundberg, Osbacken, Sweden

[73] Assignee: Aktiebolaget Tudor, Stockholm, Sweden

[22] Filed: June 16, 1969

[21] Appl. No.: 833,390

[30] Foreign Application Priority Data

May 21, 1968  Sweden..................................6842/68

[52] U.S. Cl. .................................. 136/6, 136/36, 136/134, 136/166
[51] Int. Cl. ............................... H01m 35/04, H01m 35/32
[58] Field of Search ..................... 136/6, 17, 18, 36, 37, 38, 136/39, 40, 134, 166

[56] References Cited

UNITED STATES PATENTS

| 3,261,719 | 7/1966 | Shannon | 136/134 |
| 3,514,342 | 5/1970 | Brennan | 136/134 |
| 3,518,127 | 6/1970 | Aronson | 136/134 |

FOREIGN PATENTS OR APPLICATIONS

| 8,578 | 1890 | Great Britain | 136/17 |
| 98,889 | 5/1923 | Switzerland | 136/36 |

*Primary Examiner*—Donald L. Walton
*Attorney*—Burns, Doane, Benedict, Swecker & Mathis

[57] ABSTRACT

A multicell storage battery characterized by the improved path of current flow provided by the positioning of the conductive terminals of the electrodes and the input and output connections between the cells in alternating fashion adjacent the tops and bottoms of the cells. These connections may additionally be positioned in alternating fashion adjacent the front and rear of the cells so that current flows diagonally in the electrodes thereby to tend to reduce resistance in and between the electrodes. Moreover, electrodes may be contoured so that the peripheries of the plates thereof are contained within acute angles having apexes located generally diagonally of one another substantially at the intersection of adjacent plate sides, whereby more effective utilization of the active material in the electrodes is obtained.

A method of making a multicell storage battery wherein an open-sided casing with cell connecting terminals positioned in alternating fashion adjacent the tops and bottoms of the cells is provided, and then electrode plate sets are inserted laterally into open-sided cells and connected to the cell connectors. Afterwards, the side walls are secured in position. Thus, assembly problems associated with the internal positioning of the cell connecting terminals are obviated.

13 Claims, 6 Drawing Figures

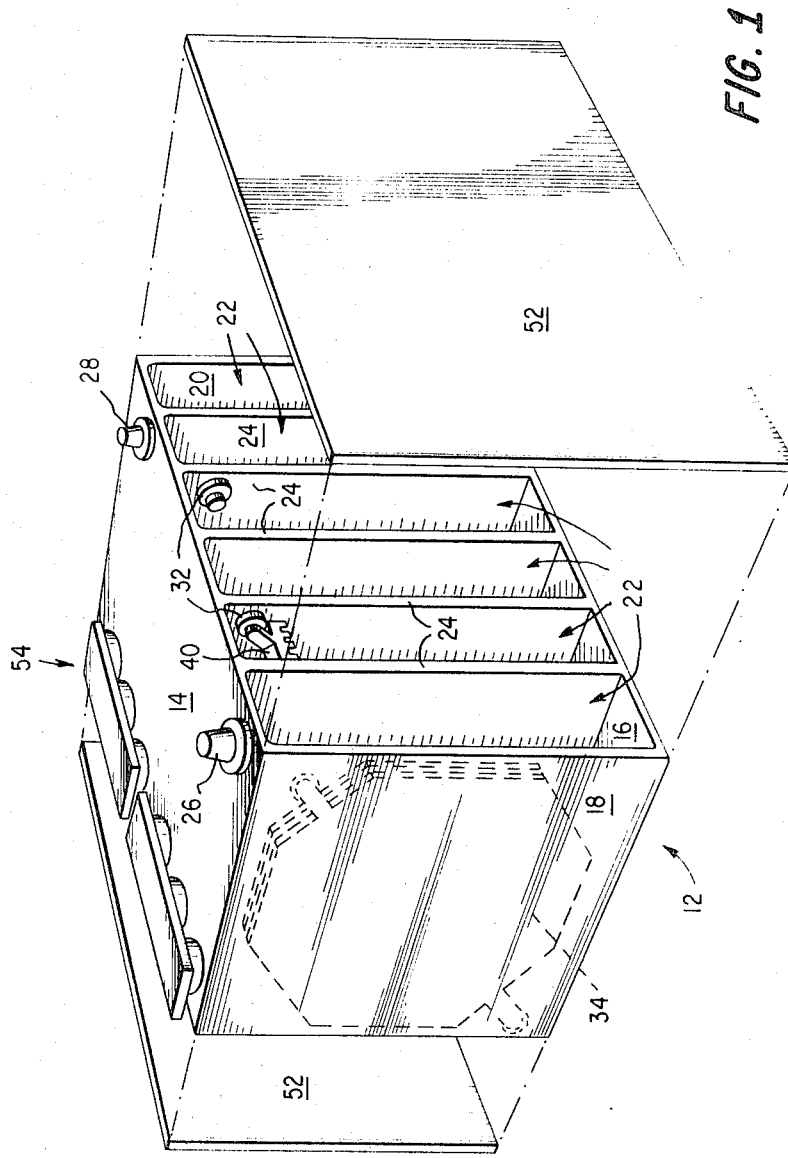аа

Patented March 21, 1972
3,650,833
3 Sheets-Sheet 2
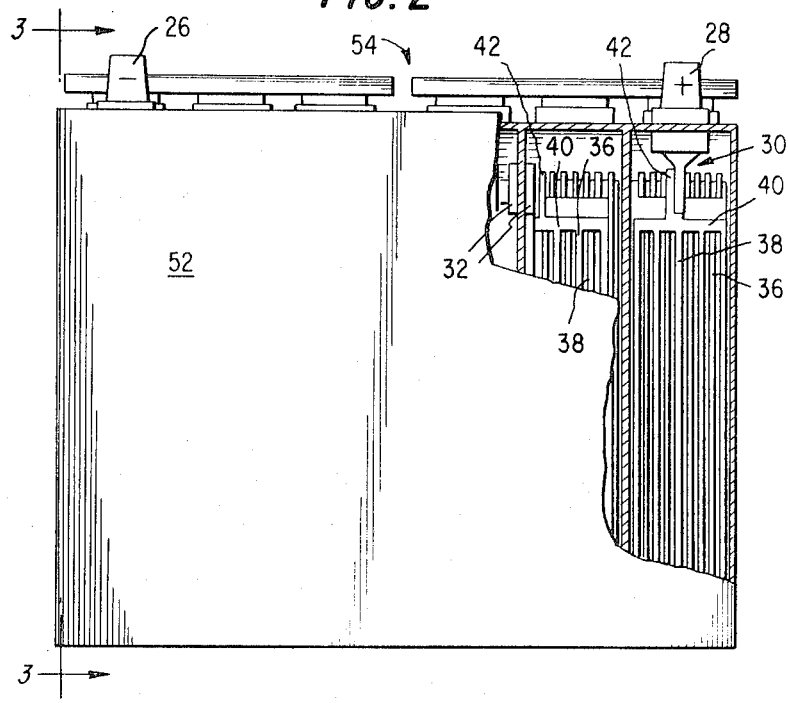
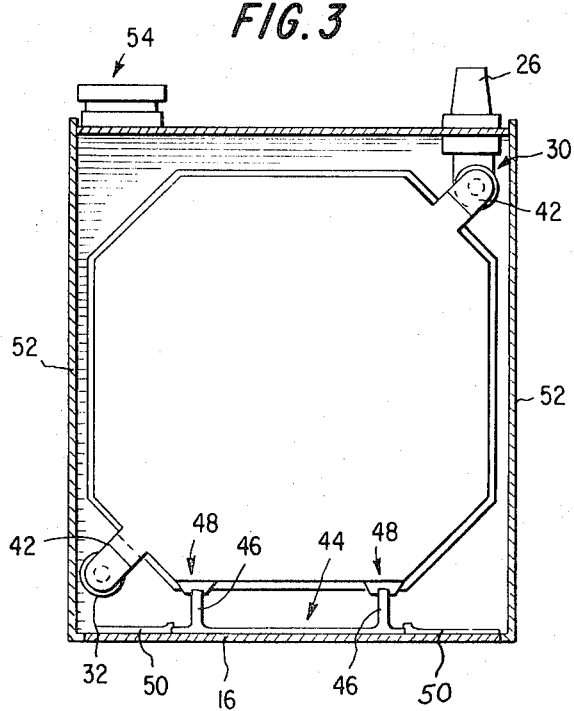
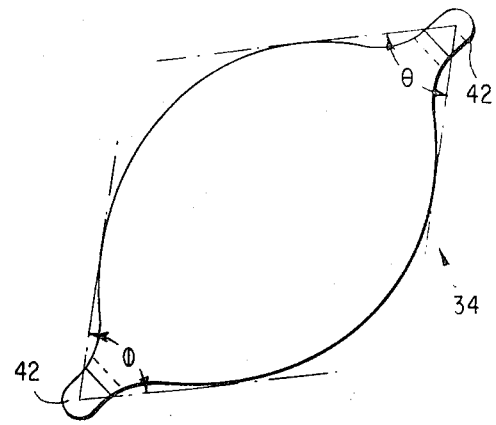
INVENTORS
ERIC G. SUNDBERG
BY Burns, Doane, Benedict
Swecker + Mathis
ATTORNEYS Patented March 21, 1972

INVENTORS
ERIC G. SUNDBERG

BY *Burns, Daane, Benedict Swecker & Mathis*

ATTORNEYS

3,650,833

MULTICELL STORAGE BATTERY

BACKGROUND OF INVENTION

1. Field of Invention

This invention relates to a multicell accumulator or storage battery, particularly of the lead-acid type. In particular, this invention relates to a multicell storage battery in which the resistance in and between electrodes is reduced and in which more efficient utilization of the active material in the electrodes is obtained; and to a method of making such a storage battery, which method obviates assembly problems associated with internal positioning of cell connecting terminals.

2. Description of Prior Art

It has been customary in the past to arrange the current outlets of the electrodes of a multicell storage battery for connection to an outer circuit in the lid of the battery. It has also been more recently proposed to connect the electrodes in adjacent cells through electrical connections located inside the battery casing and under a unitary cover as set forth in U.S. Pat. application Ser. No. 617,139 of Hugo C. L. Nyberg et al., now U.S. Pat. No. 3,484,299, assigned to the assignee of the present invention.

However, in both of these arrangements, the capacity of the storage battery is not entirely satisfactory in relation to the potential capacity of the battery that may be realized through a better utilization of the electrode material. This may be attributed to the fact that electrode terminals and the connecting terminals between adjacent cells are all located at substantially the same level or height with respect to the bottom wall of the battery casing. Therefore, the resistance to current passing between electrode terminals within a cell is magnified by the fact that the current must travel through a tortuous path up and down the electrode body.

It would, therefore, be highly desirable to provide a multicell storage battery with reduced resistance in between the electrodes.

It would also be desirable to provide such a battery wherein more effective utilization of the active material in the electrodes is obtained.

According to the present invention, this improved battery capacity is accomplished by arranging electrode terminals generally diagonally opposite one another and connecting these terminals to similarly positioned cell connecting terminals. In the construction of such a battery, or for that matter in the construction of any battery in which cell connecting terminals are located on the cell partition walls of the casing, it would be highly desirable to facilitate manufacture of the battery by obviating assembly problems associated with the positioning of the cell connecting terminals internally of the battery casing.

OBJECTS AND SUMMARY OF THE INVENTION

It is, therefore, a general object of the invention to provide a multicell storage battery which will obviate or minimize the problems of the sort previously noted.

It is a particular object of the invention to provide a multicell storage battery with improved capacity.

It is a further object of the invention to provide such a battery wherein the resistance is reduced in between the electrodes.

It is a related object of the invention to provide a multicell storage battery wherein the electrode lattice is dimensioned to more efficiently utilize the active material of the electrodes.

It is still another object of the invention to provide both a battery casing and electrodes which enable realization of the above objects.

It is an independent object of the invention to provide a method of making a multicell storage battery wherein the connections between cells are arranged on the cell partition walls, which method obviates assembly problems associated with the positioning of the cell connecting terminals internally of the battery casing.

A preferred embodiment of the invention intended to accomplish at least some of the foregoing objects comprises a multicell storage battery wherein the input and output electrical connecting terminals between the cells are arranged in alternating fashion adjacent the tops and bottoms of the cells. The output terminals and input terminals of adjacent cells are connected and incorporated into the partition walls of the battery. These terminals are also positioned in alternating fashion adjacent the front and rear of the cells so as to be generally diagonally opposite one another. Electrodes in the form of interleaved plate sets having generally diagonally opposite conductive terminals are connected to the cell connecting terminals thereby to reduce the resistance in and between the electrodes.

In order to more efficiently utilize the active material of the electrodes, the electrode lattice is formed such that peripheries of each of the electrode plates are contained within acute angles located generally diagonally of one another substantially at the intersection of adjacent plate sides. Such an electrode body may take a rhomboid, elliptical, or other generally similar configuration in side elevational view.

A preferred method of assembling the preferred battery involves laterally inserting the electrodes into open-sided cells and then connecting the electrode terminals to the internally positioned cell connecting terminals. Afterward, the side walls of the battery casing are secured in position to form a liquid-tight battery.

BRIEF DESCRIPTION OF THE DRAWINGS

Other objects and advantages of the present invention will become apparent from the following detailed description as illustrated in the accompanying drawings, in which:

FIG. 1 is an exploded perspective view of a battery according to the present invention, with only one of the electrodes shown in phantom, and only one of the pole bridges illustrated as coupled to a cell connector;

FIG. 2 is a partially broken away, side elevational view of the battery of FIG. 1 when completely assembled;

FIG. 3 is a cross-sectional elevational view taken along line 2—2 of FIG. 1;

FIG. 4 is a side elevational illustration of an alternative preferred configuration of an electrode;

DETAILED DESCRIPTION OF PREFERRED FORMS OF THE INVENTION

Figure 5:
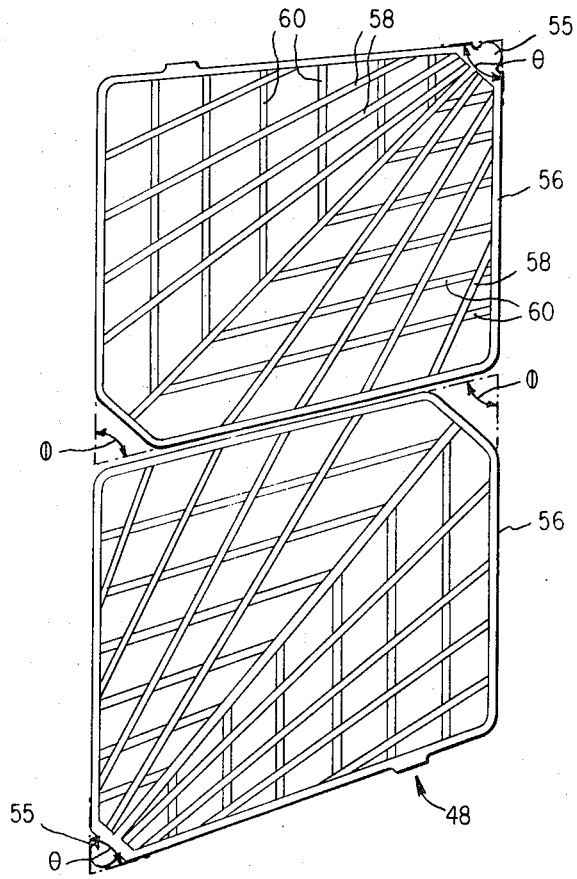
FIG. 5 is an exploded, side elevational view of another alternative configuration of an electrode.

Referring now to FIG. 1, it will be seen that the battery of the present invention includes a casing formed of an open-sided body 12 having upper, lower and end walls 14, 16, 18 and 20, respectively.

A plurality of cells 22 are formed within the casing open-sided body 12 by means of a plurality of partition walls 24 formed generally parallel to the end walls 18 and 20. The partition walls 24 and end walls 18 and 20 as well as the upper and lower walls 14 and 16 may be integrally formed together by casting or the like. It will be appreciated that although six cells 22 are illustrated, fewer or more cells may be provided in the battery as desired.

Battery terminals, or posts, 26 and 28 are located on the upper casing wall 14 and project through that upper wall into the outermost ones of the cells 22, as indicated at 30 (FIGS. 2 and 3). A plurality of input and output cell connecting terminals 32 extend through the partition walls 24 into adjacent ones of the cells 22. As used herein the terms input and output, when used in reference to the connecting terminals 32, refer to the direction of current travel respectively to and from a cell 22. It will be apparent that the cell connecting terminals 32 and the battery posts 26 and 28 may be readily cast with the open-sided casing body 12, or that body 12 may be formed with apertures to facilitate the ready insertion of the posts and cell connecting terminals during battery assembly.

For a purpose hereinafter more fully described, the input and output cell connecting terminals 32 are positioned alternately adjacent the tops and bottoms of the cells, and are also positioned alternately adjacent the forward and rear portions of the cells on opposite side partition walls 24 thereof. The output and input connecting terminals 32 of adjacent cells are electrically coupled together in any suitable manner, and may actually be opposite ends of a single member extending through a partition wall 24.

An electrode 34 is positioned in each of the cells 22, although for the purposes of illustration, only one of these electrodes is schematically illustrated in phantom in FIG. 1. Each electrode 34 consists of parallel plates in positive and negative plate sets 36 and 38 (FIG. 2) which are assembled together into an interleaved body. For simplicity, the electrode lattice has been shown only in FIG. 5. The parallel plates of the plate sets may be prevented from contacting each other by conventional separators, such as the one schematically shown at 39 in FIG. 6.

The plates of each set are connected to one another, as subsequently described, by a pole bridge 40 from which a conductive arm 42 projects outwardly. These arms 42 serve to provide conductive terminals employed to electrically connect the plate sets to the cell connecting terminals 32 by welding, or in any other suitable manner.

It will be appreciated that the arms 42 of each electrode are arranged generally diagonally opposite one another for cooperation with the similarly arranged cell connecting terminals 32 and battery posts 26 and 28.

The electrodes 34 may be readily positioned in the cells 22 by lateral insertion through the open-sided casing member 12. Each electrode may be supported on a support bracket 44 which may also be laterally inserted into the cell 22. The brackets 44 rest on the bottom casing wall 16 (FIG. 3) and are provided with upwardly projecting flanges 46 which extend the length of the electrodes 34. The plates of each set are provided with projecting tabs which rest on the flanges 46, as indicated at 48. These tabs may, if desired, be suitably notched or grooved. After assembly of the electrodes 34 along with the support brackets 44, locking plates 50 are inserted into the cells 22 in abutting engagement with opposite sides of the brackets 46. The battery casing side walls 52 are then positioned to close the open-sided cells. The side walls 52 may be welded, cemented or otherwise secured to the open-sided casing body 12 to maintain each cell 22 liquid-tight. Also, the side walls 52 serve to bear against the locking plates 50 to maintain them in position against the support brackets 46.

It will be apparent that the foregoing method of constructing the battery eliminates problems associated with the fact that the cell connecting terminals 32 are positioned internally of the battery casing. Since the electrodes are laterally inserted into the cells 22, the connecting terminals 32 do not obstruct assembly, as they would in the case of inserting from the top or bottom.

The battery may be provided with electrolyte through a suitably capped and conventional filler assembly 54. If desired, this filler assembly may be integrally cast with the casing body 12.

Figure 6:
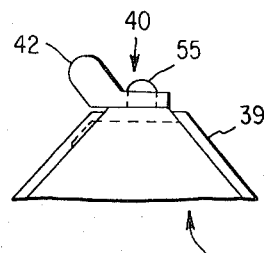
FIG. 6 is an illustration of the attachment of a pole bridge to the connecting tab of an electrode.

In FIG. 6, the connection between a pole bridge 40 and an electrode plate set 38 is illustrated. These bridges 40 may be connected to each plate of the set by welding or otherwise securing the base of the bridge to connecting tabs 55 projecting from each of the electrode plates.

It will be appreciated that with the pole bridge arms 42 of the electrodes and the cell connecting terminals 32 arranged alternately at the tops bottoms bottom of the cells, the path of current flow in the plates is such that the resistance is reduced in and between the electrodes by as much as one-half when compared with conventional arrangements. Moreover when the pole bridge arms 42 and cell connecting terminals 32 are additionally positioned alternately along the forward and rear portions of the cells 22 so as to be generally diagonally located, the conductive capacity for electric current is substantially equalized in all sections of the electrodes.

Since the active material adjacent the outer portions of the electrodes 34, i.e., the material spaced furthest from the diagonal line between the connectors, is more poorly utilized, the cost of electrode manufacture may be reduced by eliminating this material. For example, as shown in FIG. 4, the plates are generally elliptical in shape when viewed in side elevation.

In FIG. 5, it will be seen that a generally rhomboid configuration may be employed for the electrodes, thereby to also more effectively utilize the active material in the electrodes.

It will be readily apparent that such effective utilization of active material will be realized with configurations other than those shown in FIGS. 4 and 5 so long as the peripheries of the plates of the electrode body are contained within acute angles "$\theta$" and "$\phi$" having apexes located generally diagonally of one another substantially at the intersection of adjacent plate sides.

FIG. 5 illustrates the electrode plate lattice employed in cooperating plates 56 where this effective material utilization is sought. This lattice is formed by oppositely extending, interconnected sets of webs 58 and 60, which substantially converge on the apexes of the opposite angles "$\theta$" and "$\phi$" respectively. Adjacent the apex of the angle "$\theta$" the previously described connecting tabs 55 are located; and at 48 a tab which may be supported by one of the previously described flanges 46 on the support bracket 44 is shown.

SUMMARY OF ADVANTAGES AND SCOPE OF THE INVENTION

Thus, it may be seen that in following the present invention, a multicell storage battery with a substantially high capacity is provided by arranging the electrode conductive terminals and the input and output connecting terminals between the cells alternately along the tops and bottoms thereof, thereby to reduce the resistance in and between the electrodes.

Moreover, by further alternating these terminals along the forward and rear portions of the cells, the conductive capacity in all sections of the electrodes is generally equalized by reason of the generally diagonal current path.

Also of importance is the fact that with this diagonal current path arrangement, the cost of electrode plates may be reduced and more effective utilization of the active material of the electrodes may be obtained by suitable electrode plate configurations.

The method of manufacturing a battery according to the present invention also advantageously eliminates problems associated with the internal location of the cell connecting terminals by lateral insertion of the electrodes into open-sided cells.

Although the invention has been described in connection with several preferred and illustrated embodiments and methods, it will be appreciated that additions, substitutions, modifications and deletions other than those specifically described, will occur to those skilled in the art, and may be practiced without departing from the spirit and scope of the invention.

I claim:

1. A multicell storage battery comprising:
   a casing;
   a plurality of cells in said casing, each of said cells being defined by spaced partition walls;
   electrolyte in each of said cells;
   input and output connecting terminals mounted in each of said cells alternately adjacent the top and bottom thereof with the output and input terminals of adjacent cells being electrically coupled together, said input and output terminals of each cell and said conductive terminals of said plate sets of each cell being additionally positioned alternately adjacent the forward and rear portions of that cell, whereby the path of current travel in each cell is generally diagonally of the cell so as to minimize resistance in and between said electrodes; and an electrode positioned in each of said cells, each of said electrodes comprising a positive and a negative conductive plate set, each of said plate sets including a conductive terminal and a plurality of plates coupled to one another and to the conductive terminal of the set, said conductive terminals of said positive and negative plate sets in each cell being each positioned respectively in contact with one of said input and output terminals of that cell and being interleaved and forming a body in which the configurations of said plates are such that the peripheries of said plates are located within acute angles having apexes located generally diagonally of one another substantially at the intersection of adjacent sides of the plates, thereby to more effectively utilize the active material in said electrodes.

2. A multicell storage battery according to claim 1 wherein:
the configurations of said plates are generally rhomboid.

3. A multicell storage battery according to claim 1 wherein:
the configurations of said plates are generally elliptical.

4. In a multicell storage battery having electrodes with two conductive terminals in each cell, the improvement comprising:

input and output cell connectors arranged alternately adjacent the tops and bottoms of said cells and connected respectively to one each of said conductive terminals of said electrodes, said input and output connectors in each cell being positioned generally diagonally opposite to one another, and said electrodes being formed as an interleaved body made up of plates, the peripheries of which are located within acute angles having apexes located generally diagonally of one another substantially at the intersection of adjacent sides of the plates.

5. The improvement according to claim 1 wherein:
the configurations of said plates are generally rhomboid.

6. The improvement according to claim 1 wherein:
the configurations of said plates are generally elliptical.

7. An electrode body comprising:
a positive set of interconnected plates;
a negative set of interconnected plates interleaved with said positive set of interconnected plates;
a first conductive terminal connected to each of said plates of said positive set, and a second conductive terminal connected to each of said plates of said negative set, said first and second conductive terminals being spaced generally diagonally of said electrode body, and said plates having a configuration such that the peripheries thereof are located within acute angles located generally diagonally of one another substantially at the intersection of adjacent sides of the plates.

8. An electrode body according to claim 7 wherein:
the configurations of said plates are generally rhomboid.

9. An electrode body according to claim 7 wherein:
the configurations of said plates are generally elliptical.

10. In an electrode body formed of plates for a multicell storage battery, the improvement comprising:

positive and negative conductive terminals spaced generally diagonally of said body, with the peripheries of said plates of said body being located within acute angles having apexes located generally diagonally of one another substantially at the intersection of adjacent sides of the plates.

11. The improvement according to claim 10 wherein:
the configurations of said plates are generally rhomboid.

12. The improvement according to claim 10 wherein:
the configurations of said plates are generally elliptical.

13. A multicell storage battery comprising:
casing;
a plurality of cells in said casing, each of said cells being defined by spaced partition walls carrying inter-cell connections
electrolyte in each of said cells;
a single input and a single output connecting terminal for each of said cells alternately adjacent the top and bottom and additionally alternately adjacent the forward and rearward portions of the cell so that the path of current travel in each cell is generally diagonally of the cell so as to minimize resistance in and between said electrodes, with the output and input terminals of adjacent cells being electrically coupled together by said inter-cell connections; and an electrode positioned in each of said cells, each of said electrodes comprising a positive and a negative conductor plate set, each of said plate sets including
a conductor terminal and
a plurality of plates coupled to one another and to the conductive terminal of the set,
said conductive terminals of said positive and negative plate sets in each cell being each positioned respectively in contact with only one of said input and output terminals of that cell.

* * * * *